Figure 1:
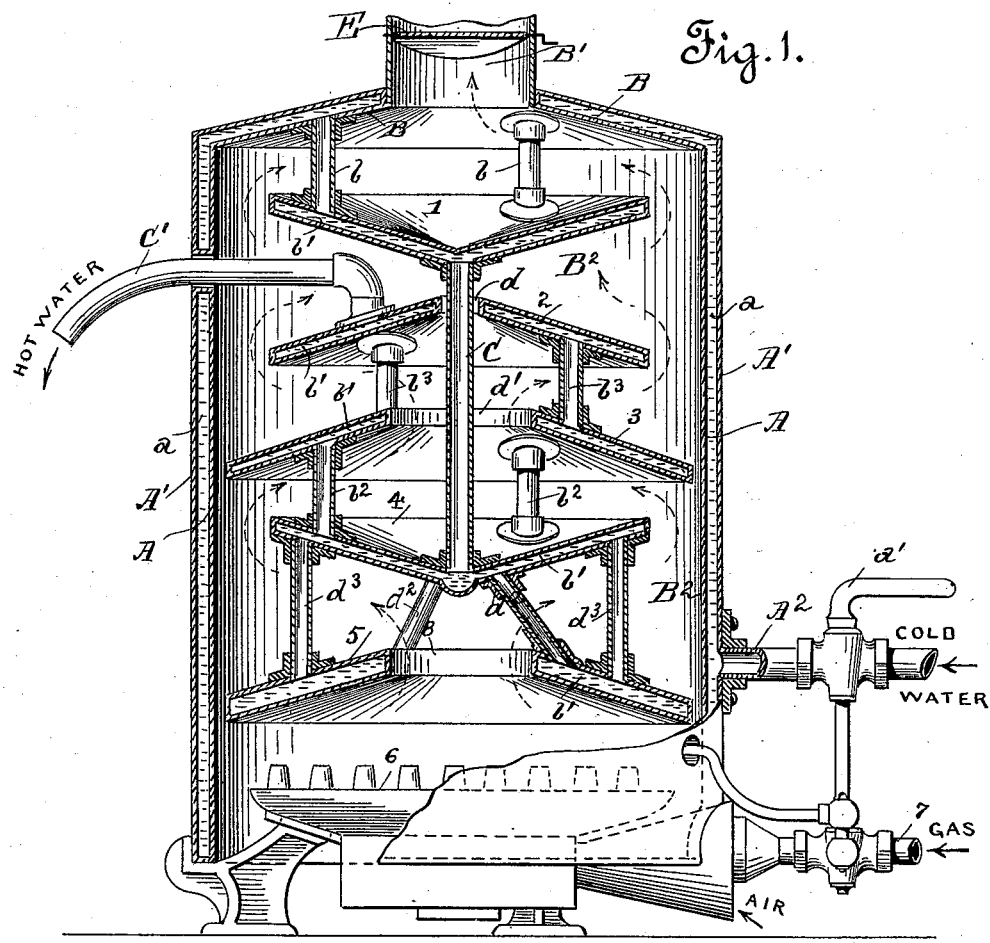

(No Model.)

E. J. VERRUE.
WATER HEATER.

No. 588,300. Patented Aug. 17, 1897.

Witnesses.

Inventor.
E. J. Verrue
by N. A. Acker
his Atty.

UNITED STATES PATENT OFFICE.

ERNEST J. VERRUE, OF SAN FRANCISCO, CALIFORNIA.

WATER-HEATER.

SPECIFICATION forming part of Letters Patent No. 588,300, dated August 17, 1897.

Application filed November 6, 1896. Serial No. 611,234. (No model.)

*To all whom it may concern:*

Be it known that I, ERNEST J. VERRUE, a citizen of the United States, residing at San Francisco, in the county of San Francisco and State of California, have invented certain new and useful Improvements in Water-Heaters; and I do hereby declare that the following is a full, clear, and exact description thereof.

The present invention relates to a certain new and useful water-heater adapted for use in connection with bath-rooms, barber-shops, saloons, and such other places as require water to be quickly heated; and it consists in the arrangement of parts and details of construction, as will be hereinafter fully set forth in the drawings and described and pointed out in the specification.

The object of my invention is to provide a water-heater which, while allowing the maximum calorific effect to be secured, shall be simple in construction, inexpensive of manufacture, and which, while possessing considerable heating-surface for the water, occupies but little room when placed in position.

In order fully to comprehend my invention, reference must be had to the accompanying sheet of drawings, forming a part of this application, wherein—

Figure 2:
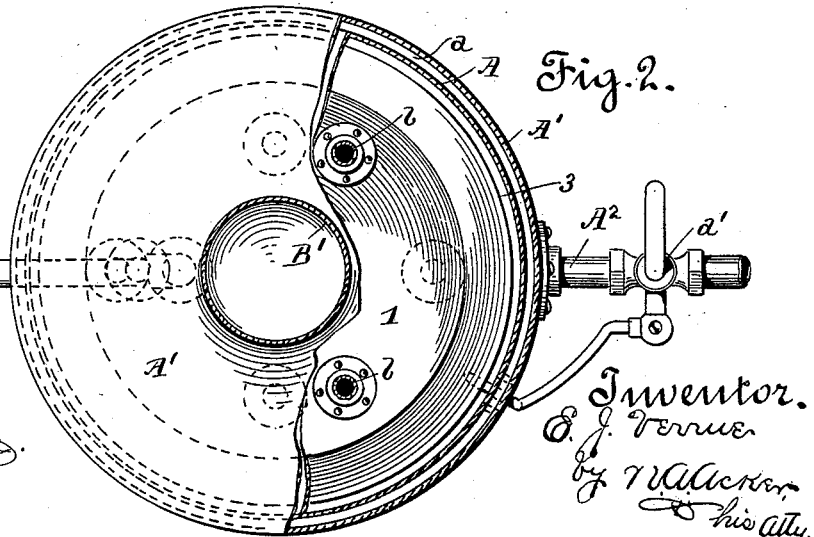

Figure 1 is a vertical sectional view of the apparatus; and Fig. 2 is a top plan view of the apparatus, partly broken away.

In the drawings the letter A represents the hollow casing of the heater, which is surrounded by the outer shell or casing A', so as to form an annular space $a$. Through the outer shell or casing A' near its bottom extends the water-supply pipe $A^2$, the flow of water therethrough being controlled by the cock $a'$. The water from the supply-pipe fills the space $a$, thus making the inner casing A completely water-jacketed. The lower and the upper ends of the outer shell or casing are united to the inner casing A so as completely to close the water-space $a$ at the top and at the bottom, and the upper portion of the outer shell or casing is inclined in accordance with the pitch or inclination of the top B of the inner casing A. Through the top B of the inner casing is cut a circular opening, within which is inserted the lower end of the exhaust-flue B', which flue may be provided with any suitable damper, as at E, in order to control the draft of the said flue.

Within the chamber $B^2$ is located a series of water-reservoirs 1, 2, 3, 4, and 5, one placed above the other. The upper reservoir 1 is connected to and suspended from the conical top B by means of the short pipes $b$, which pipes communicate with the water-space $a$ and the interior of the reservoir 1. Each reservoir is a closed one, being composed of two plates so united as to form a chamber $b'$. The reservoir 1 is of concave or saucer shape, and it is connected with the concave or saucer shaped reservoir 4 by means of the central water-pipe C. These reservoirs and the conical reservoir 2 are considerably less in diameter than are the conical reservoirs 3 and 5, whose diameter is almost sufficient entirely to fill the chamber $B^2$. The reservoir 3 is placed a short distance above the reservoir 4, being held thereabove and connected to the said reservoir by means of the short pipes $b^2$, while the reservoir 2 is connected with and supported a short distance above the reservoir 3 by means of the short pipes $b^3$. The central water-pipe C extends through the small central opening $d$, cut through the reservoir 2, and the central heat-escape opening $d'$, formed in the water-reservoir 3.

The water from the water-space $a$ escapes into the water-reservoir 1 by means of the pipes $b$, and from said reservoir flows downward into the water-reservoir 4 by means of the central water-pipe C. As the water-reservoir 4 is filled with water the water escapes therefrom and is forced upward into the reservoir 3 through the pipes $b^2$, from which reservoir the water escapes into the reservoir 2 through the pipes $b^3$. It will thus be noticed that the water must completely fill one reservoir before it can rise into the next reservoir, and, owing to the fact that the diameters of the respective reservoirs vary, the circulation of the water will be checked and the water be detained for a considerable length of time in each compartment or reservoir.

Through the water-jacketed casing near its upper end extends the outlet-pipe C' for the hot water, which pipe communicates with the reservoir 2, as shown. This outlet-pipe is controlled by any suitable cut-off cock. (Not shown.)

In order, further, to retard the circulation of the water in order that it may be exposed to the action of the heat for a longer time, the reservoir 5 is suspended below the reservoir 4 out of the direct circulation, so as to serve as a dead-water reservoir. This reservoir is connected to the reservoir 4 by means of the pipes $d^2$, which lead from the lowest point of the reservoir 4 and communicate with the reservoir 5 at its highest point, and by means of the pipes $d^3$, which lead from the reservoir 5 at about its lowest point and communicate with the reservoir 4 at about its highest point. The water flows from the reservoir 4 into the reservoir 5 until the said reservoir 5 is completely filled. This reservoir remains filled with water at all times and it cannot be emptied by drawing water from the pipe C'. As this reservoir is directly over the heating-flame it is important that the said reservoir should remain filled with water at all times in order that the hot air striking against the said reservoir may not cause the same to burn out, which would be apt to occur if the said reservoir should become empty. The water leaves this reservoir only when the heat-supply is sufficient to cause the water therein to boil, when the water will be forced upward through the pipes $d^3$ into the reservoir 4 at its highest point, the displaced water being resupplied from the lowest point of the reservoir 4 by means of the pipes $d^2$.

Within the lower portion of the chamber $B^2$ is located below the conical reservoir 5 the burner or heater 6. Any style of burners may be used in my device, but I prefer and have shown an ordinary Bunsen burner. This burner receives the supply of gas from the gas-pipe 7.

When the burner or heater is lighted, the flame thereof bears against the under surface of the reservoir 5 and heats the water contained therein. The hot air striking against the under face of the conical reservoir is directed toward the center thereof and escapes upward through the central opening 8. As the hot air ascends it strikes against the under face of the concave reservoir 4 and, being deflected toward the outer edge thereof, flows upward until its passage is interrupted by the under face of the second large conical reservoir 3. The hot air impinging against the under face of this reservoir is deflected downward against the upper face of the reservoir 4. The hot air flows upward from between the reservoirs 3 and 4 through the central escape-opening $d'$, formed through the reservoir 3. As the hot air flows upward through this escape-opening it strikes against the under face of the small conical reservoir 2. The hot air escapes around the edge and through the opening $d$ of the reservoir and, bearing against the under face of the reservoir 1, is partly deflected downward upon the upper face of the reservoir 2. The hot air finally escapes from the chamber $B^2$ through the exhaust-flue B'. It will thus be observed that owing to the peculiar shape and arrangement of the several reservoirs the hot air is detained within the chamber $B^2$ until the reservoirs have received the full benefit of the hot air flowing therethrough.

The shape of the reservoirs enables them to support a large volume of water without danger of their collapsing, and inasmuch as the under surfaces of the reservoirs lie in the path of the draft the reservoirs receive the full benefit of the hot air, so that there is practically no heat wasted.

Having thus described my invention, what I claim as new, and desire to secure protection in by Letters Patent of the United States, is—

In a water-heater, the combination with a water-jacketed casing having a conical top provided with a central out opening, of a water-inlet pipe discharging into the lower portion of the water-jacket, a concavo-convex reservoir suspended within the upper portion of the heating-chamber by means of short pipes which connect the said reservoir with the upper portion of the water-jacket, a second concavo-convex reservoir located within the lower portion of the heating-chamber supported by and communicating with the upper reservoir by means of a central water-pipe, a plurality of conical reservoirs located between the upper and the lower concavo-convex reservoirs, said reservoirs being connected to each other and to the lower concavo-convex reservoir by means of short water-pipes, the concavo-convex reservoirs and one of the conical reservoirs being considerably less in diameter than the heating-chamber and the other conical reservoir being approximately of the same diameter as the heating-chamber, and provided with a central heat-escape opening, and of a conical dead-water reservoir provided with a central opening located below the lower concavo-convex reservoir, said reservoir being connected at approximately its highest point and approximately at its lowest point to the concavo-convex reservoir at approximately its lowest and approximately its highest point respectively.

In testimony whereof I affix my signature, in presence of two witnesses, this 21st day of October, 1896.

ERNEST J. VERRUE.

Witnesses:
N. A. ACKER,
A. K. DAGGETT.